Figure 8:
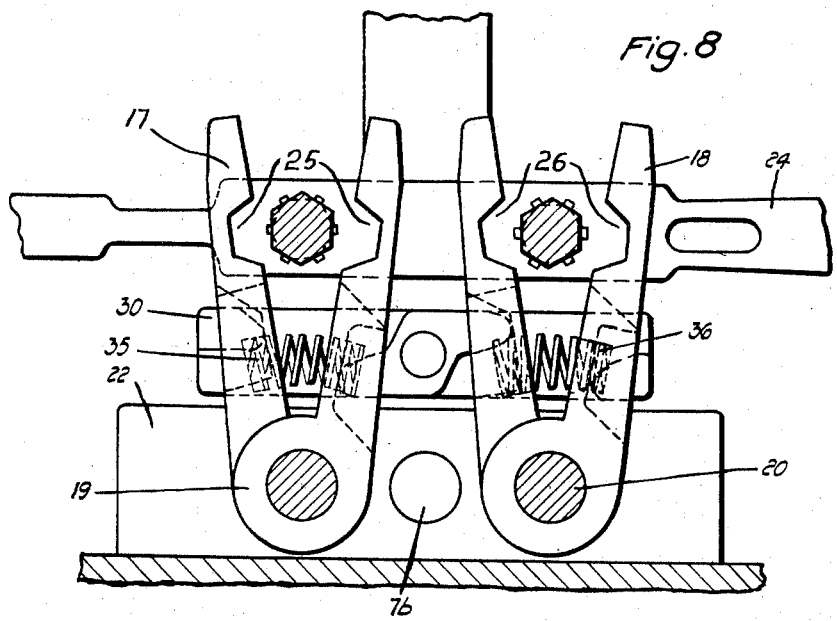

Dec. 30, 1952 N. E. F. HOLMQVIST 2,623,275
TOOL FOR MOUNTING METAL STRIPS ON RODS
Filed July 8, 1947 6 Sheets-Sheet 1
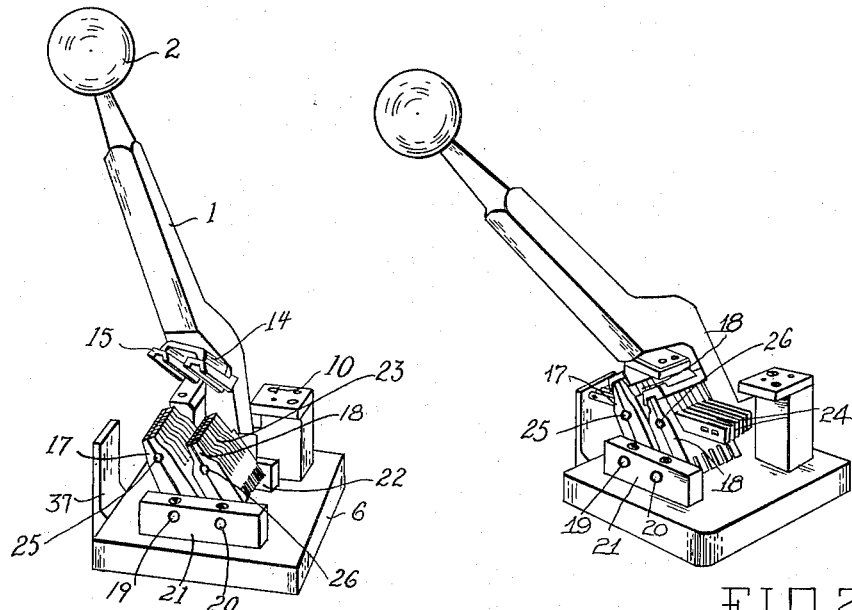
FIG.1.
FIG.2.
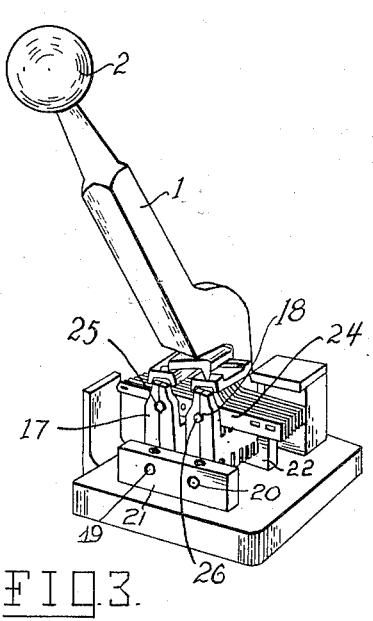
FIG.3.
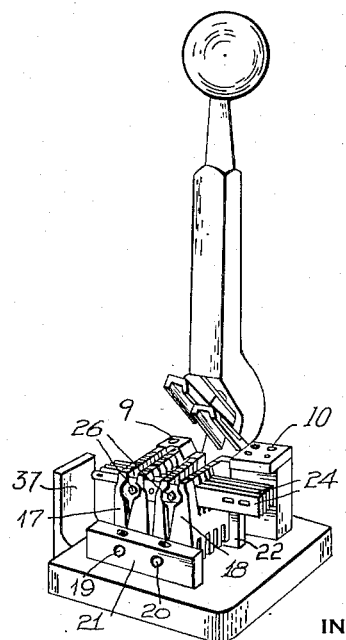
FIG.4.
INVENTOR
Nils Evert Fridolf Holmqvist
BY
Richardson, David and Norden
his ATTORNEYS.

Dec. 30, 1952  N. E. F. HOLMQVIST  2,623,275
TOOL FOR MOUNTING METAL STRIPS ON RODS
Filed July 8, 1947  6 Sheets-Sheet 2
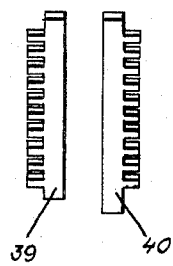
Fig. 5a
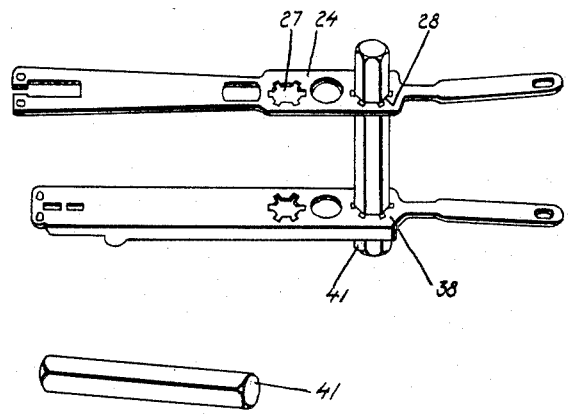
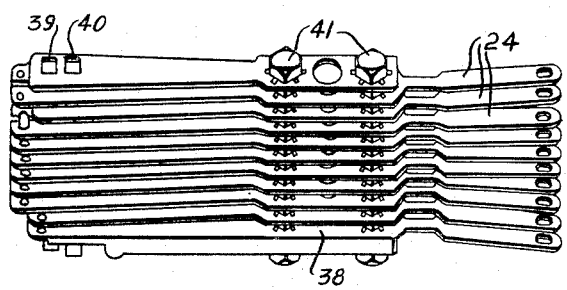
Fig. 5b
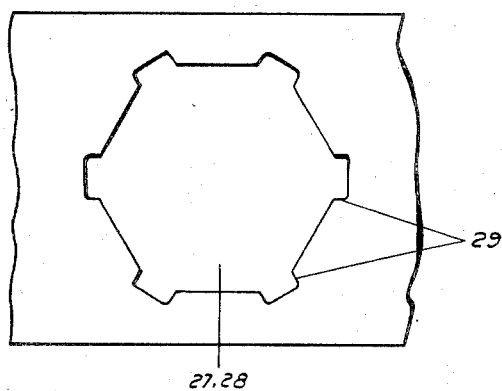
Fig. 5c

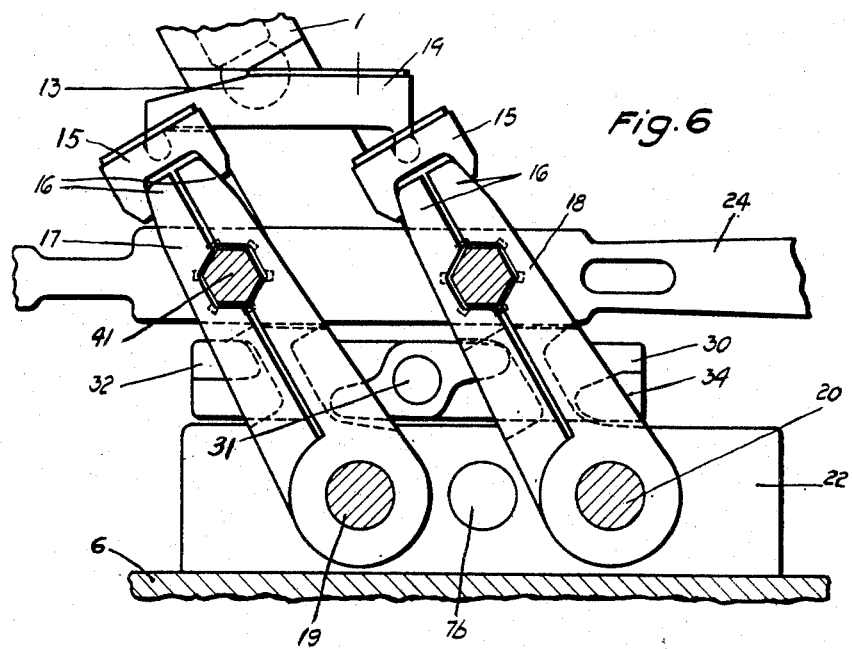
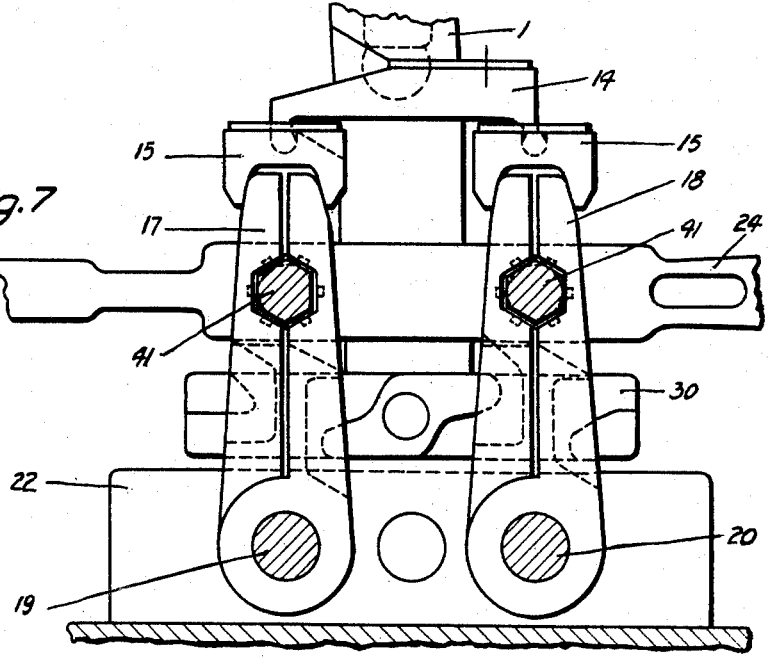

Dec. 30, 1952 N. E. F. HOLMQVIST 2,623,275
TOOL FOR MOUNTING METAL STRIPS ON RODS
Filed July 8, 1947 6 Sheets-Sheet 4

Inventor
Nils Evert Fridolf Holmqvist
by Michaies & Michaelis
attys.

Dec. 30, 1952 N. E. F. HOLMQVIST 2,623,275
TOOL FOR MOUNTING METAL STRIPS ON RODS
Filed July 8, 1947 6 Sheets-Sheet 5
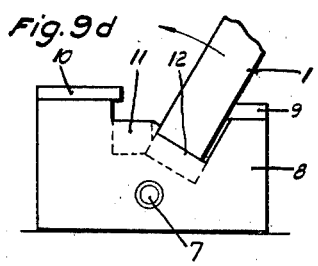
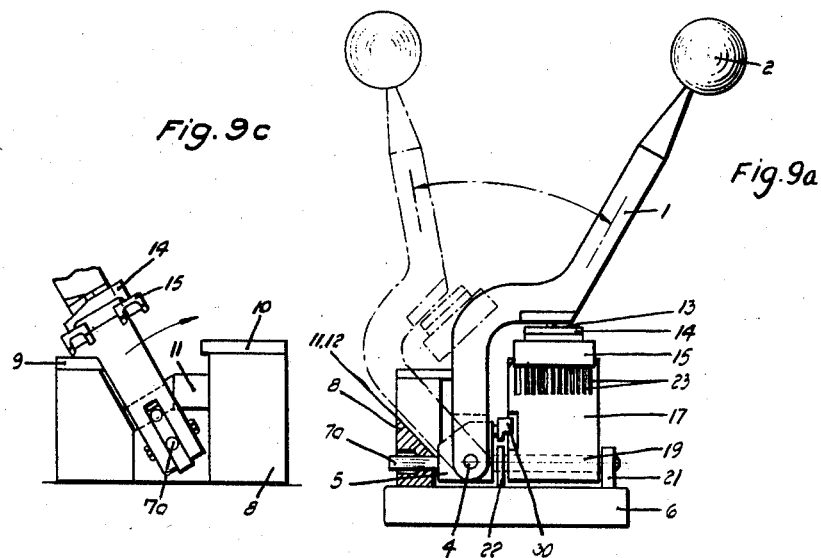
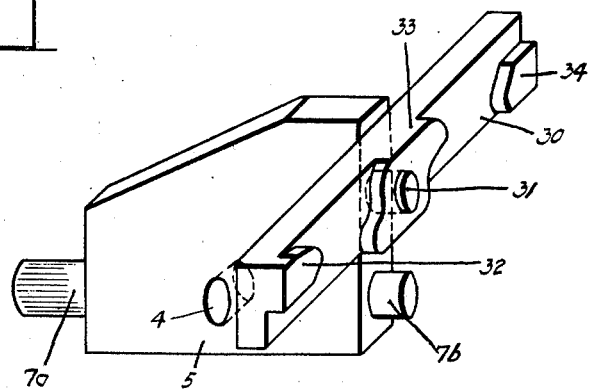
Inventor
Nils Evert Fridolf Holmqvist
by Michaelis & Michaelis
attys.

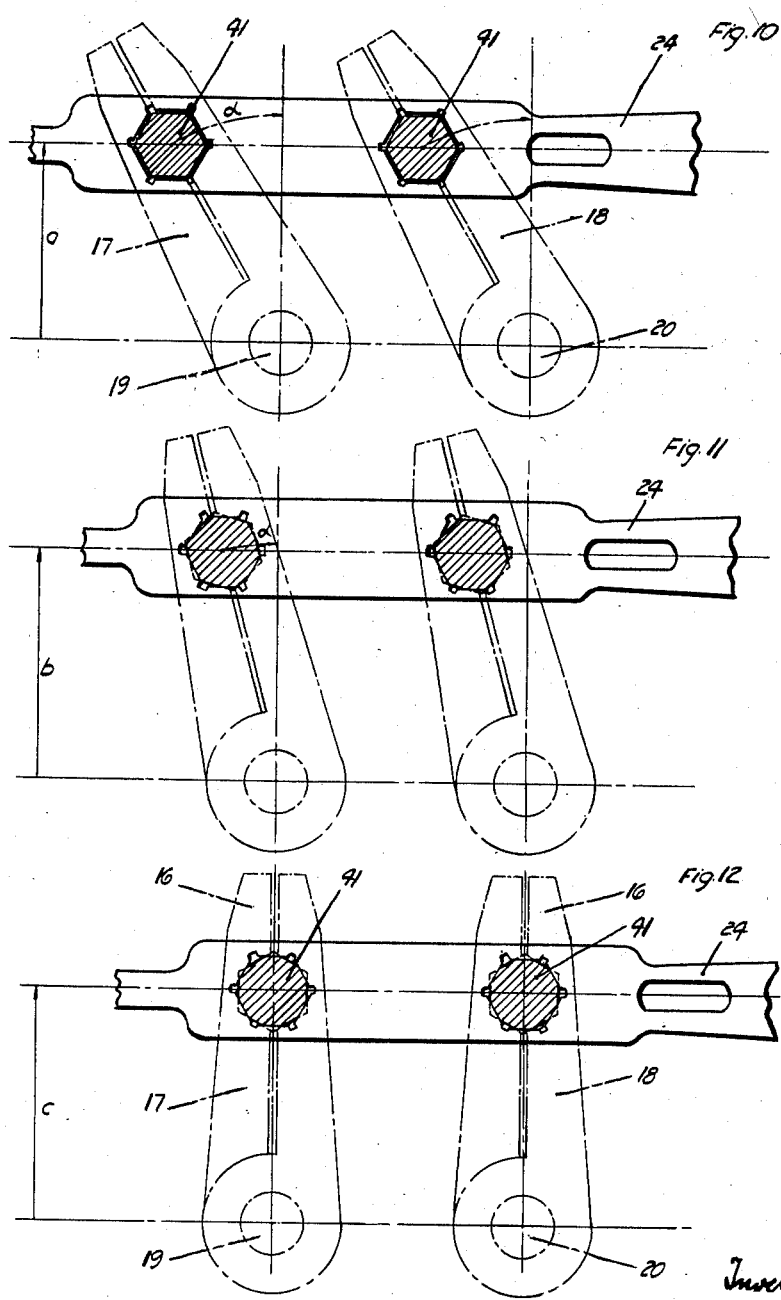

Patented Dec. 30, 1952

2,623,275

UNITED STATES PATENT OFFICE 2,623,275

TOOL FOR MOUNTING METAL STRIPS ON RODS

Nils Evert Fridolf Holmqvist, Stockholm, Sweden

Application July 8, 1947, Serial No. 759,528
In Sweden December 7, 1946

6 Claims. (Cl. 29—240)

This invention relates to tools for assembling a plurality of flat contact springs or similar parts of a multiple switch or similar device which springs are arranged in accurately spaced relationship on insulating rods to form a spring pile-up or contact spring assembly. It is particularly concerned with a tool adapted for quickly and securely assembling strip-shaped sheet metal elements formed with at least two non-circular holes on insulating rods of non-circular cross section by positioning the strips on the rods, and rotating the rods with respect to the strips simultaneously about parallel axes, thereby forcing the edges of the holes in the strips into the rod material and firmly securing the strips on the rods.

In the drawings accompanying this specification and forming a part thereof an embodiment of this invention is illustrated diagramatically and by way of example.

Figure 9B:
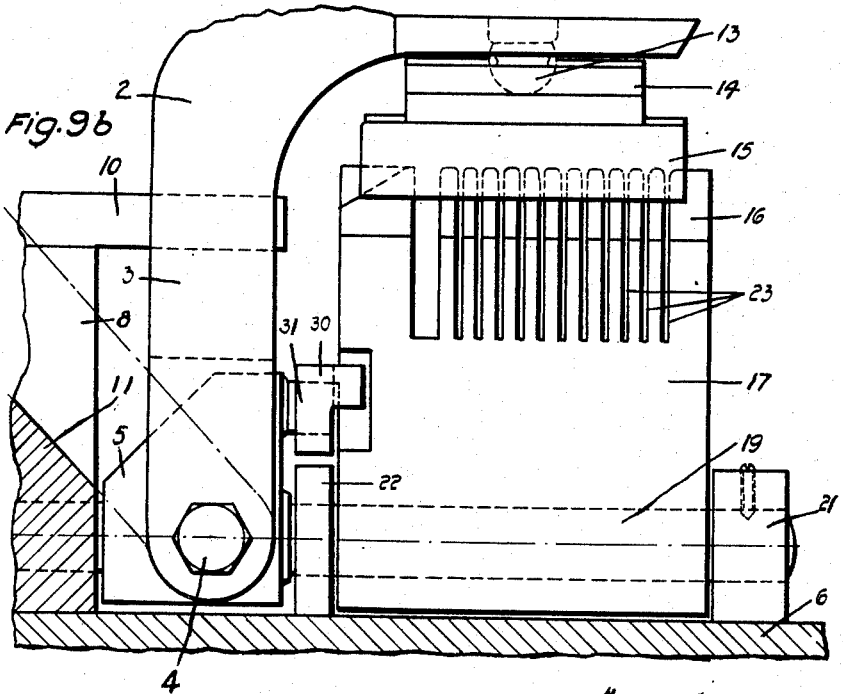

In the drawings:

Figs. 1–4 are perspective views of the tool in different positions, corresponding to different phases of the assembling operation, Figs. 5a, b and c illustrate examples of contact springs adapted to be assembled with the aid of the tool, Figs. 6 to 8 and 9b are enlarged views which show the bottom part of the tool in different positions, Fig. 9a is a side view showing the tool in its forward operating position, the rear or idle position of the operating lever in which work may be inserted or withdrawn being shown dotted, Figs. 9c and 9d are front and rear fragmentary views, respectively of the bottom portion of the tool showing the operating lever in its left-hand lateral position, Fig. 9e is an enlarged perspective view of a member on which the operating lever is universally mounted, Figs. 10 to 12 illustrate diagrammatically successive steps of the assembling operation.

The tool consists of the following main parts, which are shown in full in Figs. 1 to 4 and in detail in Figs. 5 to 12.

An operating lever 1 is provided at its upper end with a knob 2 and its lower end 3 is bifurcated. As shown in Figs. 9a and 9c this lower end is pivotally supported by a pivot 4 which in its turn is fixed to a rectangular supporting member 5, around which the bifurcated lower end 3 of the operating lever can turn. The member 5 is freely rotatably supported by means of pivots 7a and 7b partly in a rear wall 8 and partly in a bearing 22, thus universally mounting the lever 1. On the upper surface of the wall 8 plates 9 and 10 are mounted which limit the lateral turning movement of the operating lever (Figs. 9c and 9d). The rear wall 8 is cut away at its middle part at the points 11 and 12 so that the operating lever 1 in its non-operative or backwardly inclined position rests with its lower end against the downwardly sloping plane of the wall 8 at the points 11 and 12 (Figs. 9a, 9b). At the passage from its straight part to an outwardly bent part the operating lever 1 is provided at its lower side with a ball-shaped member 13, which supports a guide plate 14 for movement with the turning movement of the lever 1. The guide plate 14 is further movable to some extent in all directions being supported by the ball member 13, the maximum degree of mobility being about an axis parallel to the axis of lateral rotation of operating lever 1 turning on the pivots 7a and 7b. On the underside of the guide plate 14 two channel shaped clamping members 15 are pivotally mounted to rotate with the same lateral turning movement as the guide plate 14. By means of this suspension complete mobility of the channel members 15 in the desired direction is secured. This suspension makes it further possible that the channel members 15 can close the two pairs of gripping tongs described below, securely in the event that the two pairs of tongs cannot be closed to equal extents. In this described way the tool regulates itself within certain limits. The cross section of the channel members 15 resembles an inverted U, the inside surfaces of which are somewhat inclined in an outward direction and are so shaped that they fit over the upper somewhat wedge-shaped ends 6 of the two tongs 17—18. The tongs can turn about pivots 19, 20 between parallel coplanar axes in bearings 21 and 22. The tongs 17 and 18 consist each of a pair of shanks which are provided with a number of parallel transverse slots 23 in which springs 24 can be inserted as shown in Figs. 2 to 4 and 6 to 8. In each pair of tongs 17, 18 hexagonal gripping holes 25, 26 are formed by grooves cut into the adjacent faces of the tong shanks. These holes correspond with the cross section of the insulating rods and with holes 27, 28 in each contact spring 24. The holes in the springs 24 are further provided with six small notches 29 as shown in Figs. 6 to 8 and 10 to 12. Between the frontside of the upper edge of the member 5 and the interior edge of the tongs 17, 18 a guide plate 30 is arranged on a pivot 31 which is fixed to the member 5. This guide plate is provided with three projections 32, 33 and 34

(Fig. 9e), which projections engage corresponding notches in the tongs 17, 18 (Figs. 9a, 9b) and control the opening and closing of the tongs during the mounting operation which will be described further on. Between the shanks of the tongs two pairs of spiral compression springs 35, 36 are arranged which yieldingly urge the shanks apart into non-gripping position (Fig. 8). Finally a stop 37 is arranged on the base 6 of the tool in such a way that it can be used as a guide for the longitudinal alignment of the ends of the flat springs 24 which are inserted in the transverse slots 23 of the tongs.

When for instance a spring assembly is mounted as of the type shown in Fig. 5b, which consists of ten parallel contact springs 24, a holding spring 38 and a supporting member 39, a lifting member 40 and two insulating rods 41, the tool is operated in the following manner. When the tool is in starting position according to Fig. 1 with the operating lever 1 raised, all contact springs 24 and the holding spring 38 are inserted into the slots 23 of the tongs the contact springs being longitudinally aligned to their correct positions by means of the stop plate 37 at the side of the tool. The notched, generally hexagonal holes 27, 28 of the springs are then centered by means of a suitable removable plug or similar device (not shown) which is temporarily inserted in the corresponding holes 25, 26 of the tongs. The supporting member 39 and the lifting member 40 are inserted in the respective holes as well as two insulating rods 41 in the aligned gripping holes 27, 28. The operating lever 1 is then drawn forwardly, pivoting on the pivot 4 as shown in Fig. 2. At the same time the channel members 15 are guided over the upper ends 16 of the tongs 17, 18 which are somewhat bevelled at the edges thereof which first engage the lower sides of the channel members 15. The shanks of the tongs are thereafter closely clamped around the insulating rods 41 previously inserted in the holes. The tool is now in accordance with Figs. 2 and 6 in working position for the lateral turning movement of the operating lever and the tongs together with the contact springs are then carried into the final right hand position according to Figs. 3 and 7. During this turning operation the contact springs are mounted into a fixed unseparable contact spring assembly as shown in Fig. 5b.

The different stages of the mounting process with respect to the channel members 15 and the guide plate 30 are shown clearly in Figs. 6 and 7, with respect to the contact springs and the insulating rods the different stages are shown in Figs. 10 to 12. As may best be seen in Figs. 6, 7 and 8, the guide plate 30 is pivotally secured to the operating lever supporting member 5 by a headed pin 31. Guide plate 30 is provided with projecting lugs 32, 33 and 34 which engage corresponding slots in the rear edges of the shanks of the tongs 17 and 18. When the tongs are in their inclined position, prior to the beginning of the final turning operation, the lugs 32 and 33 hold the left hand pair of tongs in a nearly closed position, and the lugs 33 and 34, similarly hold the right hand pair of tongs in a nearly closed position. This holds the upper ends 16 of the pairs of tongs 18 and 18 in a position to be readily engaged and completely closed by the downward pressure of the channel members 15 as the operating lever 1 is drawn forwardly, prior to the beginning of its lateral rotary movement. When the operating lever 1 is turned from its laterally inclined position according to Figs. 2 or 6 respectively into the raised position according to Figs. 3 or 7 respectively, the left tong 17 is directed by the channel member 15 and the tong 18 by the other channel member 15 in such a way that the tongs follow the turning movement of the operating lever 1. During this movement the contact springs 24 are displaced in a parallel plane upwardly whereby at the same time the hexagonal rods 41 are firmly retained in their original position in the gripping holes 25, 26 of the shanks of the tongs (Figs. 6 and 7). The relative movement of the contact springs relative to the rods in the tongs of the tool during the turning movement of the operating lever results in the edges of the holes in the springs cutting into the slowly turning hexagonal rods, whereby at the end of the movement of the steering lever the spring assembly is definitely mounted.

In Figs. 10 to 12 the turning movement of the lever is shown schematically in three phases. Fig. 10 shows the start of the turning movement (angle a of the shanks of the tongs with the vertical plane=30°, distance between the centre of the axis 19, 20 of the shanks of the tongs and the centre line of the springs=a); Fig. 11 shows: the middle position of turning (angle a of the shanks of the tongs=15°, distance=b); Fig. 12 shows: the end position of turning (angle a of the shanks of the tongs=0°, distance=c). These figures show clearly that the holes 27, 28 in the contact springs retain their original position during the described course of motion, during which the hexagonal rods 41 follow the turning movement of the shanks of the tongs. It will be noted from Figs. 10, 11 and 12, that horizontal distances between the centers of the parallel pivots 19 and 20 and the centers of the holes 27 and 28 in the springs are equal, and that the center to center distance from the pivot 19 of tongs 17 to its gripping hole 25 is equal to the center to center distance from the pivot 20 of tongs 18 to its gripping hole 26. These four centers therefore lie at the apices of a parallelogram, which in the embodiment illustrated is originally oblique, but which becomes a rectangle at the completion of the lateral movement of operating lever 1.

The consequence thereof is that the rods which consist of insulating material of suitable hardness (synthetic resin or the like) are caused to be pressed into the holes 27, 28 of the contact springs which holes are provided with sharp edges. By this process of mounting the bondage between the rods and the contact springs becomes so tight that it can no longer become loosened. At the same time the distance between any two adjoining springs is kept within very narrow limits required for such electrical switching devices. After the end of the turning movement to the right hand limiting plate 10 of the tool the operating lever 1 is raised as shown in Fig. 4. At the same moment the channel members 15 during this backward movement are disengaged from the upper wedge-shaped ends 16 of the tongs the spiral springs 35, 36 in the interior of the shanks start acting and press the shanks apart into the non-gripping, or fully open position (Fig. 8). The mounted spring assembly can then be taken out of the tool.

The tool can be varied in many respects without departing from the principle of the invention. The tool can be adjusted for mounting of many different types of switching devices, contact springs, block terminals or distribution terminals and so on. The number and shape of the contact springs which shall be mounted into an assembly can vary as well as the number, the shape and the cross section of the insulating rods. The cross section of the rods and the holes in the springs respectively shall preferably not be entirely round.

The channel members 15 controlled by a common guide plate 14 can instead of that be provided with individual guide members of their own. The guide plate 30 and its lips can also be shaped differently. The tool can also be converted from manual operation by means of an operating lever shown in the example to automatic operation in which latter case the lateral and/or the back and forth going movements of the lever are actuated by some automatic controlling member.

I claim:

1. A tool of the class described adapted to position a plurality of flat metal strips having a plurality of spaced non-circular holes therein in fixed spaced longitudinal positions along a plurality of rods, the material of said rods being softer than the material of said strips, the cross-section of said rods being non-circular and shaped for insertion through the holes in said strips in a first position of rotation thereof and being cut and held by the edges of said holes upon rotation to a second position, comprising: a base member; a pair of closable gripping tongs pivotally mounted for rotation about parallel axes through an angle at least as great as the angle of rotation of said rods from said first position to said second position, the spacing between said axes being equal to the spacing between centers of two of said holes in said strips, said gripping tongs having gripping openings therein adapted upon closure of said tongs to seize said rods and hold the same against rotation with respect to said tongs during rotation of said tongs, said openings being positioned to hold said rods with the axes thereof and said axes of rotation lying at the apices of a parallelogram, said tongs further having equal numbers of transverse slots therein perpendicular to said axes of rotation and adapted to receive said strips, each slot being of a width slightly greater than the thickness of the strip received therein and of sufficient depth to align said holes in said strips with the gripping openings of the tongs to permit insertion of said rods through said gripping openings and said holes, maintaining said strips fixedly longitudinally positioned with respect to said rods; and means for holding said tongs closed to grip said rods during rotation of said tongs through said angle.

2. A tool according to claim 1, wherein said gripping openings are of non-circular cross-sectional shape conforming to the shape of said rods.

3. A tool according to claim 1, further comprising an operating lever pivotally mounted on said base and engageable with said gripping tongs to rotate the same through said angle.

4. A tool according to claim 3 wherein said means for holding said tongs closed is carried by said operating lever.

5. A tool according to claim 4 wherein said operating lever is universally mounted on said base, being rotatable about an axis parallel to and coplanar with the axes of rotation of said tongs, and wherein said tongs comprised wedge shaped portions adapted to be forced together for closure of said tongs, and wherein said means for holding said tongs closed comprises means having surfaces engageable with said wedge shaped portions upon movement of said operating lever about an axis substantially perpendicular to said first-named axis.

6. A tool according to claim 1, further comprising a supporting member carried by said base member and rotatable about an axis parallel to the axes of rotation of said tongs; spring means carried by said tongs and disposed to urge the same to open position; and a guide member pivotally supported by said supporting member and comprising portions engaging said tongs and shaped to hold the same at least partially closed with said rods in said first position and to permit said tongs to open under the influence of said spring means with said rods in said second position.

NILS EVERT FRIDOLF HOLMQVIST.

REFERENCES CITED

The following references are of record in the file of this patent:

UNITED STATES PATENTS

| Number | Name | Date |
|---|---|---|
| 1,576,828 | Jacobson | Mar. 16, 1926 |
| 2,001,153 | Packman | May 14, 1935 |

FOREIGN PATENTS

| Number | Country | Date |
|---|---|---|
| 385,508 | Great Britain | Dec. 29, 1932 |